June 4, 1946.  G. R. ROEMER  2,401,319
MANUFACTURE OF WIRE MESH FABRIC
Filed Dec. 7, 1942  7 Sheets-Sheet 1

Inventor
George R. Roemer
By Frease and Bishop
Attorneys

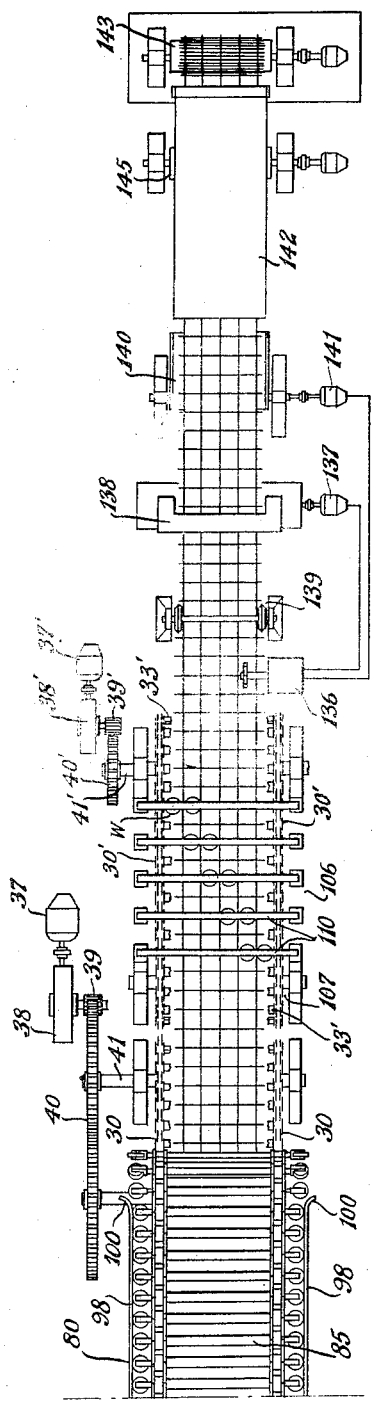

George R. Roemer
Inventor
By Frease and Bishop
Attorneys

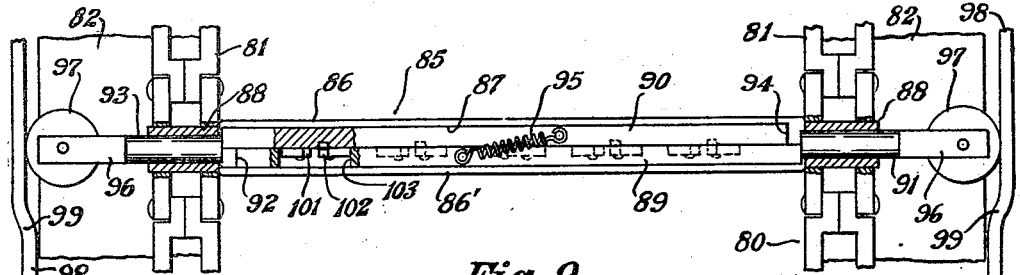
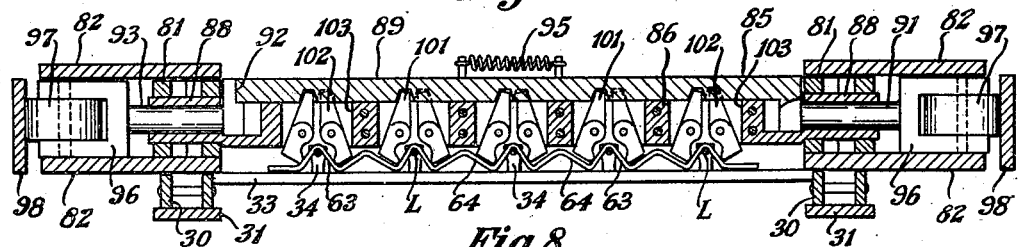
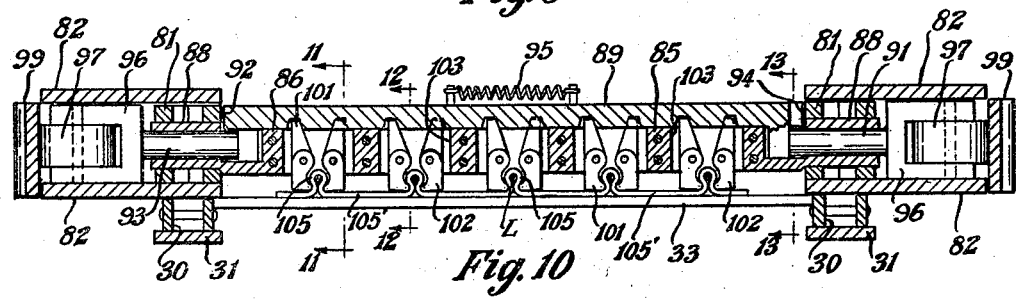
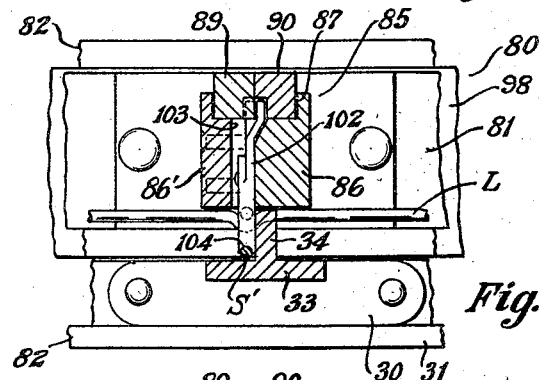
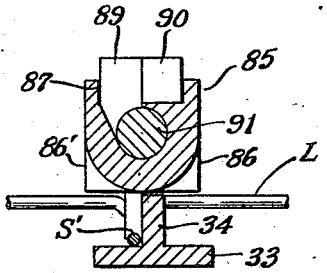
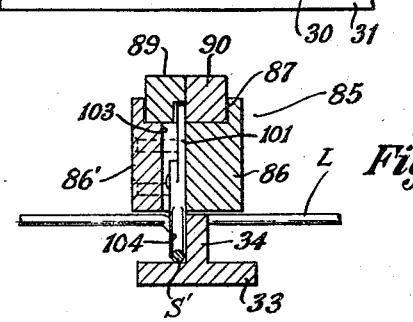

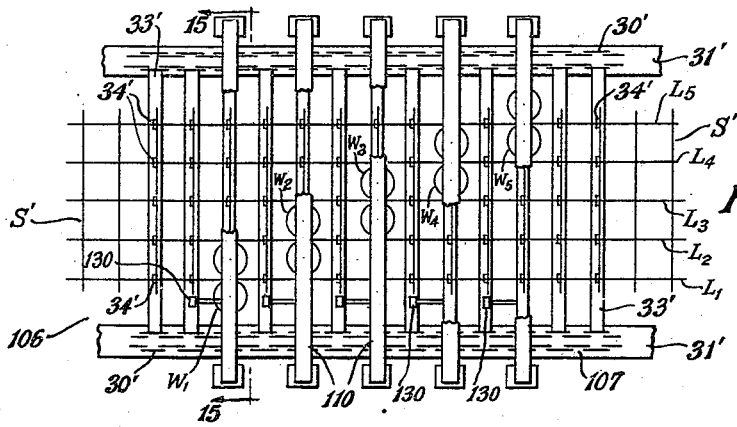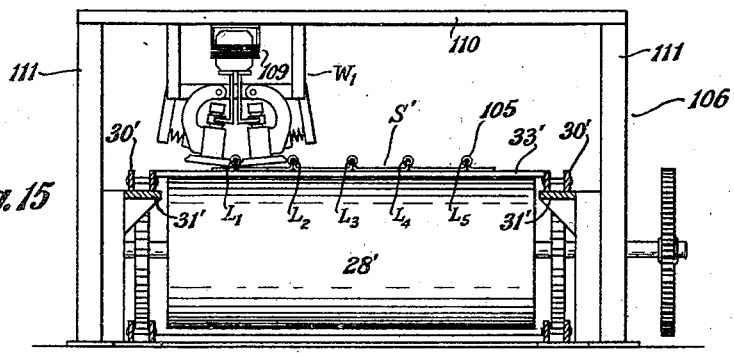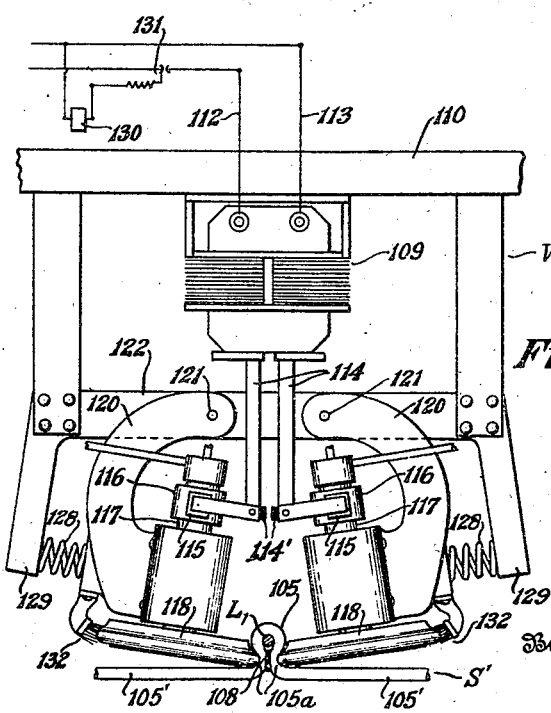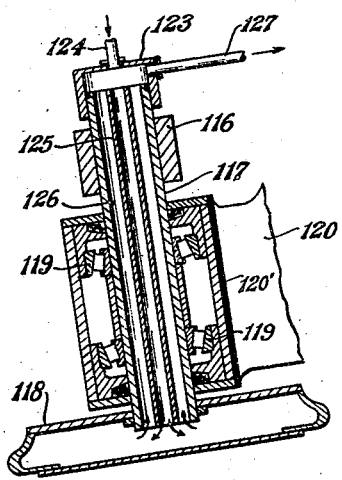

Patented June 4, 1946

2,401,319

UNITED STATES PATENT OFFICE 2,401,319

MANUFACTURE OF WIRE MESH FABRIC

George R. Roemer, Mount Lebanon, Pa.

Application December 7, 1942, Serial No. 468,116

11 Claims. (Cl. 140—7)

The invention relates to the manufacture of reticulated wire fabric, and more particularly to the manufacture of fence, netting, and the like, continuously.

In the case of fence, particularly farm fence, it is highly desirable to provide flexible or movable joints between the line wires and the stay wires in order that the fence will accommodate itself to terrain of uneven contour when it is strung along the ground. Conventional types of fence which have this property of lateral flexibility include what is known as hinge-joint, staple-tie and lock joint, but these joints require an excessive amount of wire because the wires are wrapped or twisted about each other or have separate wires twisted about them at the joints. Moreover, in fabricating or weaving these types of fence, the progressive movement of the wire fabric must be stopped while the wires are being wrapped or twisted to make one or a group of joints, so that the process is intermittent, rather than continuous and consume extra time, which adds to the cost of manufacture.

Another disadvantage of these types of fence when used as farm fence is that the joints are often rough and present sharp burrs or points which injure live stock when they rub against the fence.

Another conventional type of fence used largely for industrial enclosures is known as chain link fence and consists of interwoven diagonal wires.

This fence is very expensive to manufacture because of the complicated intermittent weaving process required to produce it, and where the fence is required to be galvanized or coated, the coating is done after the weaving. Coating after weaving not only increases the cost because of additional equipment, but because the joints between the wires tend to pick up additional coating metal, and coating after weaving is disadvantageous because the joints are not uniformly coated.

Another type of fence is welded joint fence, in which the stay wires and line wires are rigidly welded together at the joints, and which eliminates the extra wire required in many conventional types for wrapping or tying the joints, but such welded fence is substantially rigid laterally as well as longitudinally due to the rigid welded joints, and is not adapted for being used on uneven ground, so that it is not suitable as farm fence. Moreover, where coated welded joint fence is desired it does not have a pleasing appearance because the wire is coated before welding, and the welding operation changes the character of the coating to such an extent as to detract from the appearance of the coating at the joints.

I have invented a novel wire mesh fabric and a method of manufacturing the same, which overcomes the disadvantages of prior constructions and methods of manufacture, in that the fabric can be coated before weaving and the coating is not affected at the joints to any substantial extent; the fabric has flexible joints to adapt it for the use on uneven ground; and is adapted to be manufactured continuously and rapidly with a minimum of expense and material.

It is therefore a general object of the present invention to provide novel improvements in the art of making wire mesh and fence fabric, so as to overcome the foregoing disadvantages in prior constructions and methods of manufacturing the same.

A more specific object is to provide a rapid and continuous method of making wire mesh fabric including farm fence, industrial fence, and the like.

Another object is to provide a method of making a wire mesh fabric particularly adapted for use as farm fence in that it has smooth joints on both sides so as not to injure livestock rubbing against the fence.

Another object is to provide a novel method of making a fence product having movable joints providing lateral flexibility, and to provide a novel method of making the same.

A further object is to provide a novel method of making a wire mesh fabric in which the wires may be coated before being woven.

A still further object is to provide a novel wire mesh fabric and method of making the same, which involves a minimum of time, expense and material.

These and related objects are accomplished by the novel products, methods, apparatus and combinations comprising the present invention, preferred embodiments of which are disclosed herein and which is defined in the appended claims.

In general terms the product of the invention may be described as a wire mesh fabric having stay wires looped over and crimped around line wires, producing an inexpensive, light weight and laterally flexible wire fabric suitable for many purposes, and especially adapted for use as farm fence.

In general terms the novel method of producing the improved wire mesh fabric may be stated as including forming stay wires progressively with partial loops therein and dropping them at proper intervals on continuously moving line wires with the partial loops located over said line wires, and then while the stay wires move with the line wires crimping the stay wire loops around the line wires to provide joints permitting sufficient movement between the line wires and stay wires to produce a certain amount of lateral flexibility in the wire mesh fabric.

In the drawings a preferred embodiment of apparatus for carrying out the novel method is shown diagrammatically by way of example, and likewise several preferred embodiments of the novel wire mesh product are shown by way of example. However, it will be understood that various modifications may be made in the apparatus, and that the product may be otherwise modified, within the scope of the appended claims.

Referring to the drawings,

Figures 1a and 1b taken together comprise a diagrammatic plan view of a preferred arrangement of apparatus for manufacturing the novel wire mesh fabric;

Figures 2a and 2b taken together comprise a side elevation thereof;

Figure 3 is an end elevation of one embodiment of apparatus for straightening and feeding stay wires to stay wire preforming apparatus, taken substantially on line 3—3, Figure 1a;

Figure 8 is an enlarged diagrammatic transverse view of the stay wire crimping apparatus, as on line 8—8, Figure 1a, showing the crimping dies in open position;

Figure 9 is a top plan view thereof;

Figure 10 is a view similar to Figure 8, as on line 10—10, Figure 1a, showing the crimping dies in closed position;

Figure 11 is an enlarged fragmentary sectional view, as on line 11—11, Figure 10;

Figure 12 is a similar view as on line 12—12, Figure 10, with distant parts removed;

Figure 13 is a similar view, as on line 13—13, Figure 10;

Figure 14 is an enlarged diagrammatic plan view of part of Fig. 1b, showing apparatus for welding each stay wire under the line wires;

Figure 15 is a transverse sectional view thereof, as on line 15—15, Fig. 14;

Figure 16 is an enlarged fragmentary view similar to Fig. 15;

Figure 17 is a still further enlarged sectional view of a part of Fig. 16;

Similar numerals refer to similar parts throughout the drawings.

While I have shown the invention as applied to round wire, it is equally applicable to wire of other cross section such as oval, square, or other polygonal shape.

Likewise, while for convenience I have shown in Figures 1 to 15, 18 and 19 five line wires and equally spaced stay wires, it will be understood that within the scope of the invention the size, number, and spacing of the line wires and stay wires may be varied to suit the various purposes for which the wire mesh fabric is used, and the size and spacing of the line wires may differ from that of the stay wires for certain purposes.

Referring first to Figures 1a and 1b, and 2a and 2b, line wires L are pulled continuously from reels 21 through guide rollers 22 which space the wires L apart at the same intervals as desired in the finished wire mesh product. Alternate reels 23 may be provided for supplying the line wires while the reels 21 are being replenished.

Figure 20:
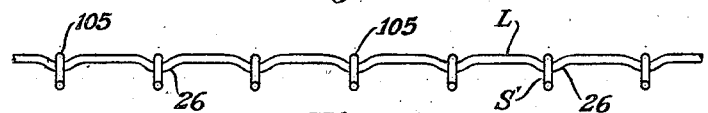
Figure 20 is a side elevation thereof.
Figure 24:
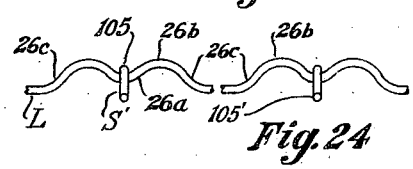
Figure 24 is a side elevation of the form shown in Figure 18.

The line wires L are then passed longitudinally in parallel relation between male and female forming rolls 24 and 25 for forming kinks or downward bends in the line wires at intervals equal to the desired longitudinal spacing of the stay wires in the finished product and said downward bends may be shaped as shown at 26 and 26a in Figures 20 and 24, so that stay wires may be laid transversely across the top of the line wires in a row of said bends and will remain in proper position as the line wires move along.

The rolls 24 and 25 may be driven as indicated at 27 from the sprocket drum 28 of a lower conveyor about to be described, or the rolls 24 and 25 may have a separate motor drive synchronized with the speed of the line wires L.

Figure 7:
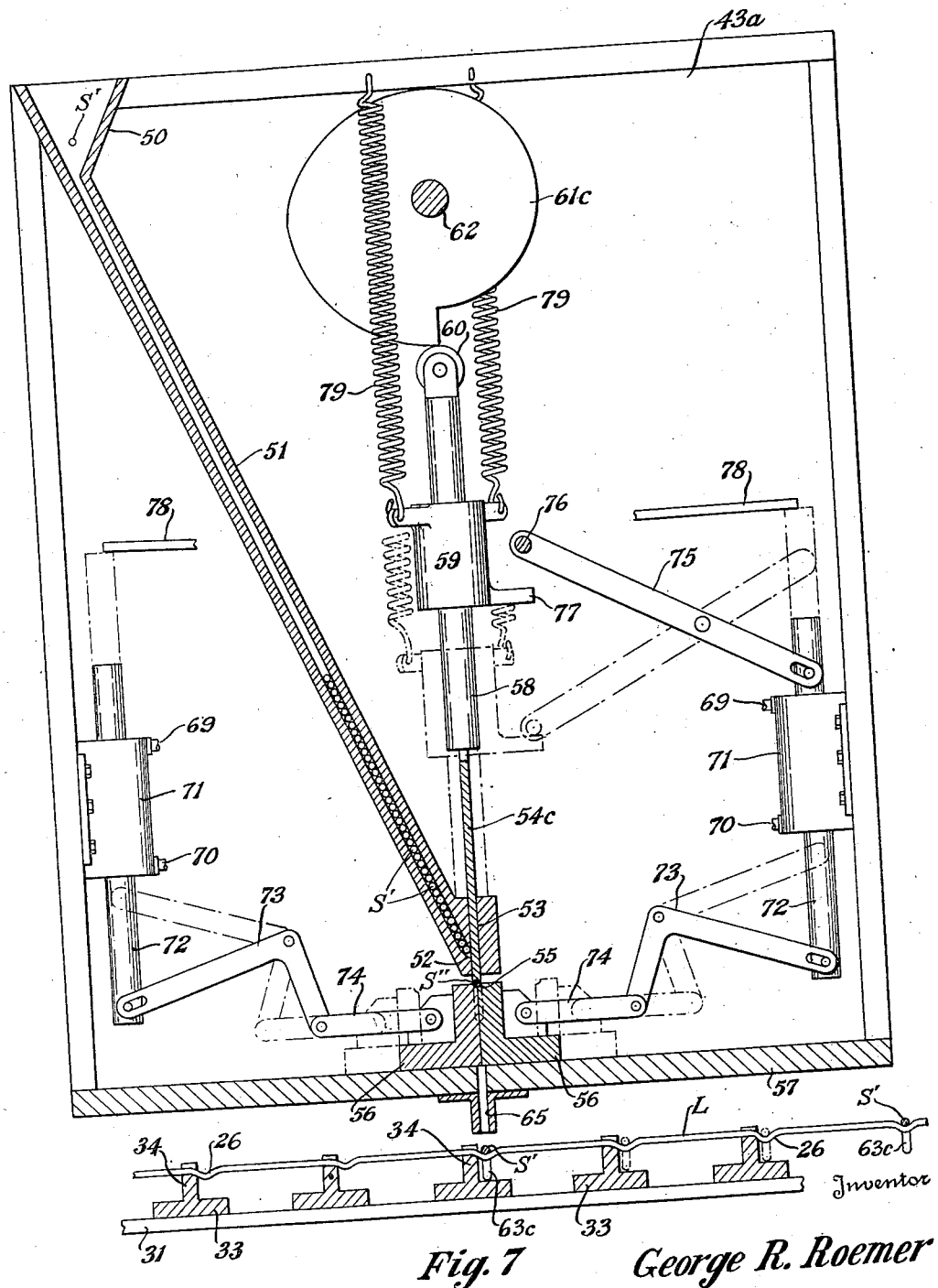
Figure 7 is an enlarged diagrammatic view of one of the stay wire preforming machines taken at right angles to Figure 4.

From the forming rolls 24 and 25, the kinked line wires pass over an endless chain lower conveyor C, the upper run 29 of which is supported immediately below the line wires and moves continuously with the line wires at the same speed. The conveyor includes endless chains 30 at opposite sides of the line wires and sliding over supporting bars 31 suitably supported on posts 32, and transverse bars 33 are connected to the chains 30 at proper intervals so that each bar 33 is located immediately below a transverse row of the downward bends 26 in the line wires L. As shown in Figures 7 and 8, each bar 33 is provided with upwardly projecting yokes 34, one side supporting each line wire immediately behind one of the bends 26 therein, for a purpose to be described.

The lower run of the conveyor is indicated generally at 35, and the rear end of the conveyor passes around sprocket drum 28 while the front end passes around a sprocket drum 36 (Figures 1b and 2b) which is driven by suitable means such as the motor 37 and gear reducer 38, pinion 39 and gear 40 on the sprocket shaft 41.

Again referring to Figures 1a and 2a, the line wires L supported by the conveyor bars 33 next pass under a series of stay wire preforming and feeding machines indicated diagrammatically at 43a, 43b and 43c. The function of these machines is to preform stay wires and deposit them on the line wires, one stay wire being located in each transverse row of the bends 26 in the line wires. Three of these stay wire forming machines are shown, and they are adapted each to deposit a stay wire in every third row of transverse bends 26 in the line wires, but the number of these machines may vary in accordance with the speed of preforming stay wires as related to the longitudinal speed of travel of the line wires.

Stay wires S are fed laterally to the machines 43a, 43b and 43c by pinch roll stands 44 from reels 45, with alternate reels 46, through wire straightening rolls 47. (See also Fig. 3.) From the pinch rolls 44, each stay wire S passes under a shear indicated at 48, which is operated at proper intervals by suitable and well known electrical or electronic tube means indicated diagrammatically at 49, so as to cut the stay wires into proper lengths S' when they fall into feed hoppers 50 at the top of the forming machines. Referring to Figures 4 to 7 inclusive, the stay wire preforming machine 43a includes a hopper 50 into which the stay wires S' drop after being straightened and cut to length. From the hopper 50 the stay wires S' pass downwardly through an inclined chute 51 by gravity, or if desired suitable conveying means may be provided for feeding the stay wires S' downwardly at a predetermined rate. The bottom of the chute communicates at 52 with a vertical slot 53 in which preforming die plates 54 are movable up and down for preforming each stay wire S' into a desired shape. The number of die plates 54 is the same as the number of line wires, and in this case five die plates 54a, 54b, 54c, 54d and 54e are shown.

As each stay wire S' passes into the vertical slot 53 with the die plates in raised position, it drops onto a half-round groove 55 formed on the top surfaces of and at the junction between two abutting lower dies 56 carried on the bottom plate 57 of the machine. This position of each stay wire S' is shown at S" in Figures 4 to 7.

Figure 1A:
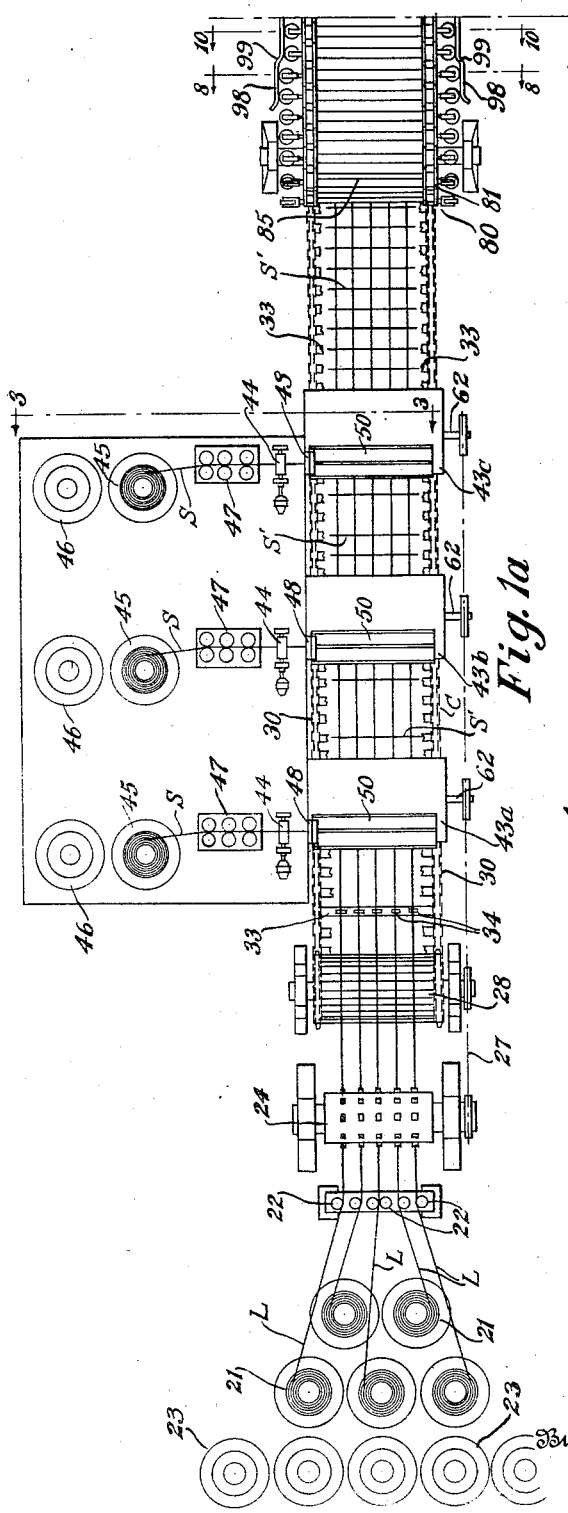
Figure 2A:
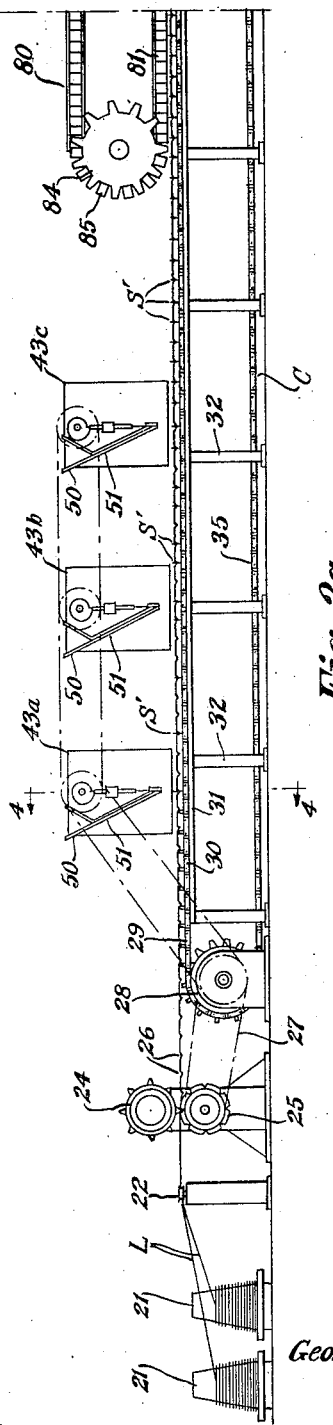
Figure 4:
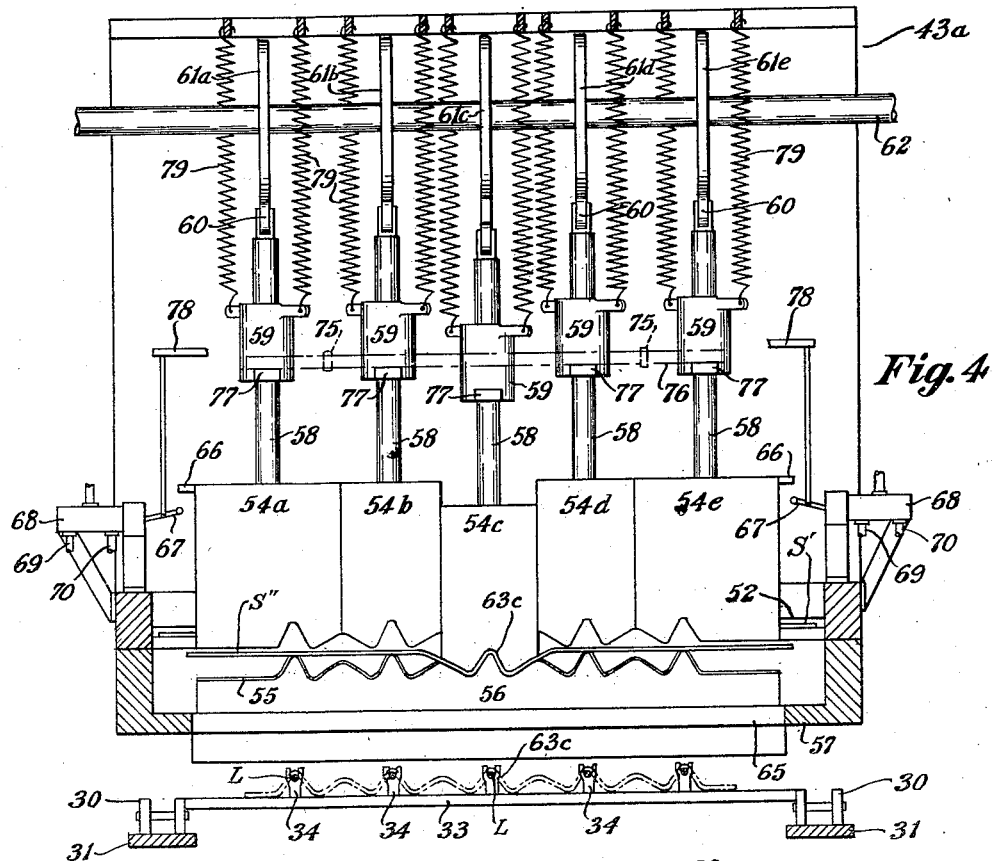
Figure 4 is an enlarged diagrammatic view of one of a plurality of stay wire preforming machines, as on line 4—4, Figure 2a, showing the first step in preforming a stay wire.

Each upper die plate 54 may be provided with an upwardly projecting shaft 58 having a collar 59 secured thereon, and the upper ends of shafts 58 have rollers 60 journalled therein for rolling on cams 61a, 61b, 61c, 61d and 61e respectively. These cams are secured on a cam shaft 62 which is suitably journaled in the frame of the machine and projects outwardly therefrom for connection with driving means. As indicated in Figure 1a, the shafts 62 may be operatively connected to the sprocket drum 28, or if desired a separate drive may be provided and synchronized with the travel of the line wires and the lower conveyor.

Figure 5:
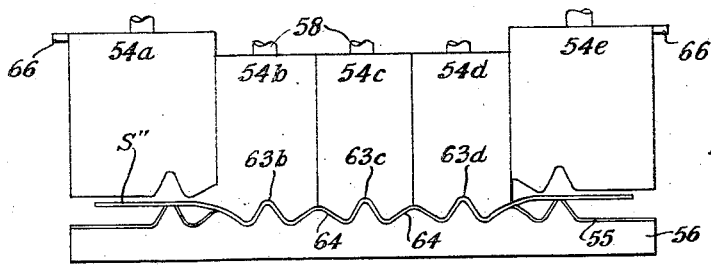
Figure 5 is a similar detached view of the forming dies, showing the next step in preforming a stay wire.

In the operation of the machine, the cams 61 are timed so that the instant a stay wire S' drops onto the groove 55, the center cam 61c moves die plate 54c downwardly past the opening 52 to prevent the next stay wire S' from entering the slot 53. The die plate 54c cooperates with the groove in bottom die plates 56 to form the central downwardly open partial loop or bend 63c in stay wire S", as indicated diagrammatically in Figure 4. Immediately thereafter cams 61b and 61d move die plates 54b and 54d downwardly to form partial loops 63b and 63d in wire S", and at the same time upward bends 64 are formed between the loops as indicated in Figure 5. Immediately thereafter the outer cams 61a and 61e move die plates 54a and 54e downwardly to form partial loops 63a and 63e with upward bends 64 between the loops, as indicated in Figure 6.

Thus the loops 63 and upward bends 64 are formed in the stay wires from the center of the wire progressively outward toward its ends, so that the metal needed for forming the loops and bends is always drawn inward from the end portions of the stay wire.

Figure 6:
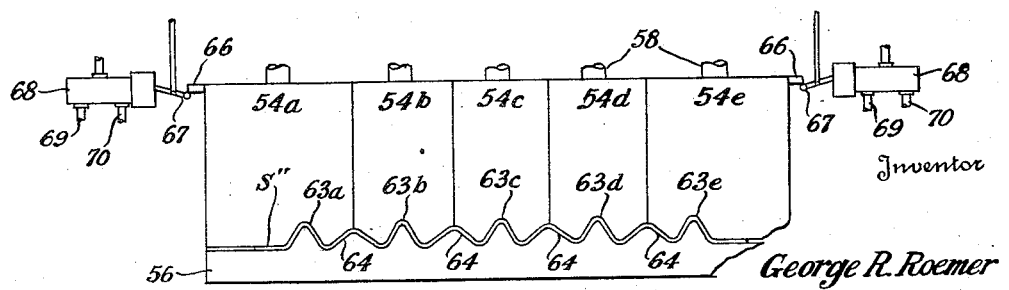
Figure 6 is a similar view showing the final step in preforming a stay wire.

After each stay wire is completely preformed into the shape shown in Figure 6, the bottom dies 56 are separated so that the preformed stay wire may pass through a slot 65 in the bottom plate 57 onto the line wires L passing thereover, and the preforming operation is timed so that each stay wire is placed on a transverse row of the downward bends 26 in the line wires. As shown in Figure 7 and in dot-dash lines in Figure 4 the loops 63 are spaced apart so that each one is positioned over a line wire, and each yoke 34 on the conveyor bars 33 is positioned immediately behind a loop 63.

A preferred form of mechanism for ejecting each stay wire S' and returning the forming dies to their original positions is shown diagrammatically in Figures 4 to 7, and preferably includes lugs 66 on the outer die plates 54a and 54e, which lugs trip the operating levers 67 of hydraulic or air valves 68 as the die plates 54a and 54e reach the positions shown in Figure 6. The valves 68 are connected by conduits 69 and 70 to hydraulic or air cylinders 71 (Figure 7) mounted on the frame of the machine.

A piston reciprocates in each cylinder 71 and the lower ends of the piston rods 72 are connected to bell crank levers 73, the other ends of which are connected by links 74 to the bottom dies 56.

The upper end of one piston rod 72 is connected to one end of a lever 75 which is connected at its other end to a bar 76 normally engaging lugs 77 on the collars 59, and as shown in Figure 7, the center shaft 58 is moved downwardly by the cam 61c so that its lug 77 is slightly below the operating bar 76.

Now when the die plates 54 are all closed as shown in Figure 6, the valves 68 operate the piston rods 72 to move them upwardly, and while the operating bar is passing through its initial downward movement prior to engaging the lugs 77, the bell crank levers 73 pull the bottom dies 56 apart sufficiently to let the preformed stay wire S" pass through slot 65. Further downward movement of the bar 76 by the piston rod 72 brings the parts to the dot-dash positions shown in Figure 7, with the die plates 54 passing into the slot 65 to eject the preformed stay wire onto the line wires. As the die plates 54 reach their lowest position, the upper ends of piston rods 72 engage a valve reversing bar 78 which is operatively connected to the operating levers 67 of valve 68, so that upward movement of the bar 78 operates the valves to return the pistons and their connected parts to normal position. The die plates 54 are returned to their uppermost positions by suitable means such as the springs 79 connecting the collars 59 to cross bars on the top of the frame of the machine.

The time period required for preforming and ejecting each stay wire may be such that each machine will deposit stay wires on every third transverse row of downward bends 26 in the line wires L traveling continuously thereunder, as indicated in Figure 7, in which case three forming machines are required as shown to deposit stay wires on every row of the bends 26. Obviously, the number of forming machines may be varied to correspond to different time periods required to preform and eject the stay wires.

After the line wires L with the stay wires S' positioned thereon leave the last stay wire preforming machine 43c, they pass under an upper endless conveyor indicated generally at 80, the lower run of said conveyor being positioned immediately above the line wires L carrying the preformed stay wires S' as shown in Figures 8 and 11.

The upper conveyor 80 preferably includes endless chains 81 located above the chains 30 of the lower conveyor on opposite sides of the line and stay wires, said chains being arranged to move slidably between supporting plates 82 and being wrapped around sprocket drums 83 and 84 at the front and rear ends of the conveyor 80. The front sprocket drum 83 may be geared to the shaft 41 of the driven sprocket drum 36 of the lower conveyor, or it may be synchronously driven by separate driving means, so as to move conveyor 80 at the same speed as the lower conveyor.

A plurality of stay wire crimping die assemblies indicated generally at 85 preferably are secured to the chains 81 at intervals equal to the spacing of the stay wires, so that as the stay wires move under the lower run of the conveyor 80 one such assembly 85 is positioned over and moves with each stay wire. Each assembly 85 preferably includes a transverse supporting bar consisting of two parts 86 and 86' screwed together (Figs. 11 and 12) and having a channel shaped groove 87 extending along its top surface, with tubular bearing portions 88 projecting from its ends and secured in spaced apart links of the chains 81.

Die operating bars 89 and 90 are slidably positioned side by side in the channel groove 87 of each transverse supporting bar, one end of bar 89 having an offset portion secured to a plunger 91 slidably journaled in one of the bearing portions 88, and the other end 92 of bar 89 being normally spaced from the opposite bearing portion 88. Similarly, the end of bar 90 opposite to plunger 91 has an offset portion secured to a plunger 93 slidably journaled in the opposite bearing portion 88, and the other end 94 of the bar 90 is normally spaced from the bearing portion in which plunger 91 is slidably journaled. Preferably the bars 89 and 90 are yieldingly held in normal position by spring means 95 connected diagonally across the tops of the bars.

Each of the plungers 91 and 93 has a yoke 96 on its outer end journaling a cam roller 97 adapted for rollably engaging a cam track 98, there being one of said cam tracks at each side of the conveyor 80 (see also Figs. 1a and 1b). As indicated in Figs. 1a, 9 and 10, the cam tracks 98 are offset inwardly at 99 near their rear ends so that as the rollers 97 move along the cam tracks and reach the offsets 99, the rollers are forced inwardly a distance equal to the amount of the offset and held in that position until they leave the front ends 100 of the cam tracks 98.

As the cam rollers are forced inwardly by the offset portions of the cam tracks 98, they move the respective die operating bars 89 and 90 to the positions shown in Fig. 10 against the yielding action of spring 95, and when the rollers leave the cam tracks at the front ends 100, the spring returns the bars 89 and 90 to the positions shown in Figs. 8 and 9.

A plurality of crimping die fingers 101 and 102 are pivotally mounted, one pair in each recess 103 formed between the bars 86 and 86' and located one over each line wire. Each of the die fingers 101 is positioned at one side of one stay wire loop 63 and each of the die fingers 102 is located at the opposite side of said loop.

The top ends of the die fingers 101 extend into recesses in the operating bar 89 (Figs. 8, 10 and 12) and the top ends of die fingers 102 are bent laterally and extend into recesses in the operating bar 90 (Figs. 8, 10 and 11) so that the inward movement of the bars 89 and 90 will close the die fingers to the positions shown in Fig. 10. As shown in Figs. 11 and 12, the lower portions of the die fingers 101 and 102 are provided with half round grooves 104 which engage the partial loops 63 and close and crimp them around and under the line wires L into closed loops 105.

During this crimping operation the upward bends 64 between the partial loops 63 supply the amount of wire necessary for closing the loops, so that the upward bends 64 of the stay wires between the loops become the straight portions 105' when the stay wires are closed and crimped around the line wires L, and the straight portions 105' are accordingly formed without being subjected to any stretching.

Due to the fact that the die fingers 101 and 102 are thus held in closed position around the loops 105 while the cam rollers 97 roll along the entire length of the cam tracks from the offset portions 99 to the ends 100 thereof, the crimped closed loops 105 become set so that they do not spring apart when the rollers 97 are released on leaving the cam tracks 98.

Referring to Figs. 1a and 1b, after the wire mesh fabric comprising line wires L with stay wires S' crimped around the same, passes beyond the upper conveyor 80, it is suitable as a finished product for many purposes. For certain purposes however, it may be required that the crimped closed loops 105 have increased resistance to being pulled apart at the line wires, so that the loops will remain closed around the line wires even though the stay wires are subjected to severe bending and pulling stresses and at the same time provide movable joints between the stay wires and line wires.

Accordingly, the wire mesh fabric on leaving the lower conveyor C next passes through a welding apparatus indicated generally at 106 in which the reverse bends of the closed loops 105 of each stay wire are spot welded together under the line wires, as the wire mesh fabric moves continuously along.

Preferably, the welding apparatus 106 includes a chain conveyor indicated generally at 107 similar in construction to and synchronized in speed with conveyor C and having endless chains 30' slidably supported on bars 31' with transverse bars 33' (Figs. 14 and 15) connected between the chains at proper intervals so that each bar 33' is located under a row of transverse bends 26 in the line wires L. As indicated in Fig. 14, each bar 33' is provided with upwardly projecting yokes 34', each supporting a line wire immediately behind each of the closed loops 105 in the stay wires, so that as the conveyor 107 is moved longitudinally it moves or pulls the wire mesh fabric along with it.

The rear end of the conveyor 107 passes around a sprocket drum 28' and the front end passes around a sprocket drum 36' (Figs. 1b and 2b) which is driven by suitable means such as the motor 37', gear reducer 38', pinion 39' and gear 40' on the sprocket shaft 41'.

As the wire mesh fabric passes through the welding apparatus, the reverse bends 105a (Fig. 16) of each stay wire S' are spot welded together as indicated at 108 by a series of welding devices indicated generally at W1, W2, W3, W4 and W5. These welding devices W are preferably spaced longitudinally and staggered laterally as shown so that W1 welds successively all of the stay wire closed loops 105 around outer line wire L1, W2 welds the loops around line wire L2, W3 welds all the loops around L3, W4 welds all the loops around L4, and W5 welds all the loops around L5.

Thus when the fabric has passed through all of the welding devices W, all of the stay wire loops 105 are welded around each line wire. The spacing and arrangement of the welding devices is to provide ample room for the same, and obviously the spacing and arrangement may be varied as desired.

The construction of the welding device W1 is shown diagrammatically in Fig. 16, all of the welding devices W being identical except as to location. The welding device includes a conventional welding transformer 109 suitably supported on an overhead bar 110 carried on posts 111 at opposite sides of the conveyor. The primary coil of the transformer is electrically connected by leads 112 and 113 to the wires of a supply line which may be 440 volts. The secondary leads of the transformer are electrically connected to conductors 114 depending therefrom, and the conductors 114 are connected to carbon brushes 115, each slidably contacting metal collars 116 secured on the rotatable shafts 117 of hollow welding disks 118 arranged to contact the closed loops of the stay wires on opposite sides of and below the line wire L1. As shown in Figs. 16 and 17, the disks 118 are slightly inclined downwardly toward each other and the outer rims of the disks are curved to conform to the reverse bends 105a of the stay wires.

As shown in Fig. 17, the shafts 117 are journaled by anti-friction bearings 119 in brackets 120 insulated at 120', which are pivoted at 121 on the cross bar 122 of a frame hung from bar 110. Each shaft 117 is hollow and has a head 123 swiveled on its upper end through which cooling water enters at 124 and flows through axial tube 125 into the hollow disk 118 for keeping the rim cool during welding. The water circulates out through concentric tube 126 and discharge pipe 127.

The rims of disks 118 are preferably spaced apart by insulated preferably adjustable means 114' slightly less than the width of the closed loops 105 below the line wire, so that as each loop is moved between and rotates the disks they are forced apart slightly against the pressure of springs 128 acting between brackets 120 and abutment bars 129 depending from cross bars 122. When the loop has passed through the disks the springs 128 move them toward each other until the insulated means 114' abut each other.

Means for momentarily energizing the transformers preferably includes well known electronic tube means indicated diagrammatically at 130, one located preferably ahead of each welding device and arranged to be excited by a stay wire passing the same. Each electronic tube 130 is electrically connected (Fig. 16) to the primary lead 113 and through a suitable contactor 131 to the other primary lead 112 of the transformer 109 so that current flows through the welding disks 118 at the instant stay wire is passing between the same.

Thus, as each loop 105 passes between the disks 118, the disks are squeezed against the reverse bends 105a and while being squeezed, welding current flows from one disk to the other through the reverse bends to spot weld them together as indicated at 108. Preferably, brushes 132 are provided for keeping the outer rims of the disks clean so as to insure good welding contacts with the closed loops of the stay wires at all times.

Again referring to Figs. 1b and 2b, if the wire mesh product leaving the crimping conveyor 80 is desired to be used as a finished product, it passes through the welding apparatus 106, but the current supply is turned off so that no welding takes place; while if a crimped and welded product is desired the current is turned on. In either event, the fabric on leaving the welding apparatus may then pass under a suitable electric timer 136 electrically connected to the driving motor 137 of a flying shear 138, for actuating the shear at proper intervals to cut the wire mesh fabric into desired lengths.

Between the timer 136 and the shear 138 a rotary edging shear 139 may be located for trimming the ends of the stay wires as desired. If desired, a slitter can be provided at this point for slitting the wire mesh fabric into two or more strips.

After leaving the shear 138, the sheared lengths of wire mesh fabric pass through a flipper 140, the driving motor 141 of which may be electrically connected to the timer 136 as shown, for directing the fabric lengths either through guides 142 to power driven reel 143 or through guides 144 to power driven reel 145.

In making wire mesh fabric for certain purposes it may be desirable to shear the fabric into relatively short lengths and transfer these lengths by conveyor to a suitable table whereon the lengths are stacked.

Figure 18:
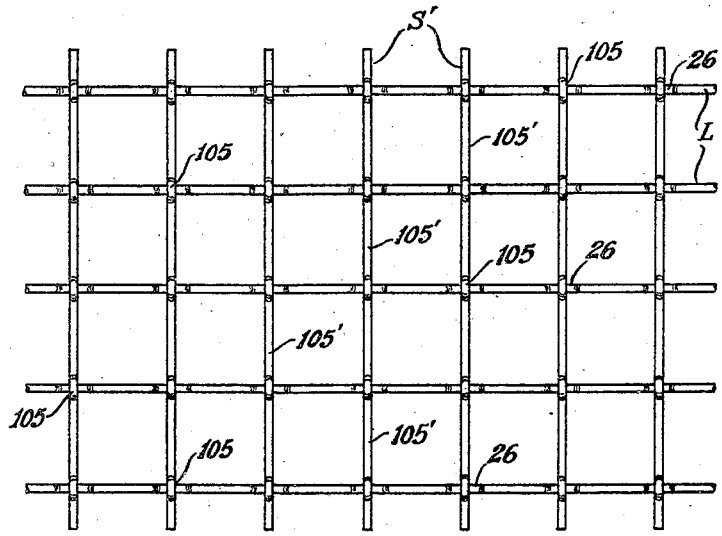
Figure 18 is an enlarged fragmentary plan view of one form of wire mesh fabric made according to the novel method.
Figure 19:
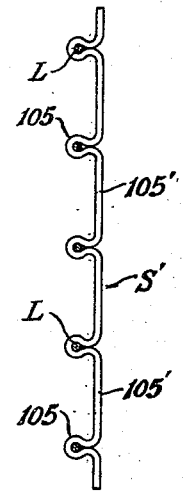
Figure 19 is an end elevation thereof.

One form of novel wire mesh fabric made according to the foregoing method is shown in Figs. 18, 19 and 20, in which the line wires L and stay wires S' are equally spaced, the stay wires S' having closed loops 105 crimped but not welded together around and under the downward bends 26 in the line wires, and the stay wires having straight unstretched portions 105' between loops 105. In this form the stay wires are shown projecting slightly beyond the outer line wires with their ends sheared or trimmed off at right angles.

Figures 21, 22, 23:
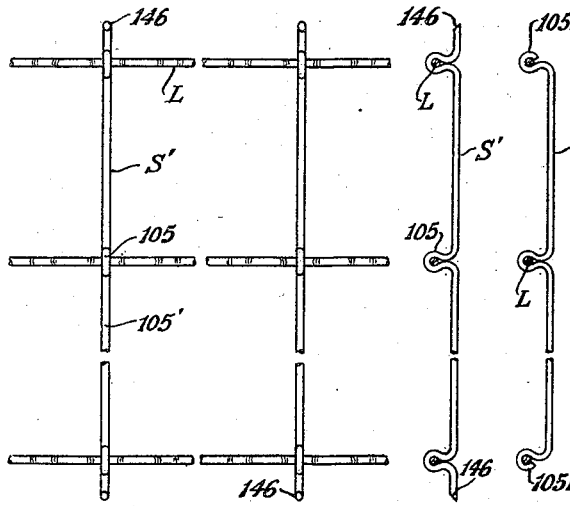
Figure 21 is a fragmentary plan view of a slightly different form of wire mesh made according to the invention.
Figure 22 is an end elevation thereof.
Figure 23 is an end elevation of a slightly different form.

In the modified form shown in Figs. 21, 22 and 24 the stay wires S' are crimped but not welded together around and under the bends 26a in the line wires, and on each side of the bends 26a the line wires are provided with reverse bends 26b and 26c so that the straight portions of the line wires between the bends 26c are substantially in the same place as the straight portions 105' of the stay wires S' between loops 105.

Thus in this modified form the fabric between joints is thinner than in the form shown in Fig. 18, and presents a somewhat smoother exterior surface at the joints on both sides of the fabric. As shown in Figs. 21 and 22 the ends of the stay wires S' are beveled or sheared at an angle as indicated at 146 so as to provide the equivalent of a strand of barb wire along the top and bottom of the fabric when used as fence. As indicated in Fig. 23 the stay wires S' may be terminated in closed loops 105b around the outer line wires L, so that no part of the stay wires project beyond the outer line wires.

Other modifications may be made in the shape of the line wires and stay wires between the joints without departing from the scope of the invention as defined in the claims.

As indicated by a comparison of Figs. 18 and 21 the spacing of the line wires and stay wires may be varied as desired. Also the spacing and gauge of the line wires may be different from that of the stay wires to adapt the wire mesh fabric for various purposes.

Figures 25, 26:
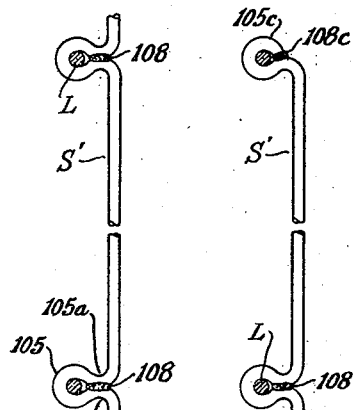
Figure 25 is an enlarged fragmentary end elevation of another form of the novel wire mesh product with the reverse bends of the stay wires welded together under the line wires.
Figure 26 is a similar end elevation of a slightly different form.

The modified form shown in Fig. 25 is similar to that shown in Fig. 16, and the reverse bends 105a of the closed loops 105 of the stay wire S' are welded together at 108 under the line wires L so as to prevent the loops of the stay wires from being pulled apart regardless of severe stresses to which the stay wires are subjected. As indicated in Fig. 26, the stay wires S' may terminate in closed loops 105c welded together at 108c around the outer line wires, so that the stay wires do not project beyond the outer line wires.

In all of the forms of the improved wire mesh product shown in Figs. 18 to 26 inclusive, the loops 105 of the stay wires are crimped around the line wires loosely enough to permit movement of the line wires therein as best shown in Figs. 25 and 26, thus providing movable joints between the line and stay wires so that the wire mesh is particularly adapted for use as farm fence because it has sufficient lateral flexibility to conform to surfaces of uneven contour, and the joints are smooth on both sides so as not to injure livestock rubbing against the fence.

The novel wire mesh fabric is adapted for various other uses, as for example concrete reinforcing for building construction, camouflage mats, and bed springs for cots; and by welding or otherwise fastening curved wires to the tops of the stay wires, ornamental lawn fence can be produced in a variety of designs.

Moreover, if a coated wire mesh fabric according to the present invention is desired, the line wires and stay wires may be coated before being woven so that the finished product is uniformly coated throughout.

The present improved method of making wire mesh fabric is more rapid than prior methods because it is continuous rather than intermittent, and provides a method of making wire mesh fabric at a reduced cost and with a minimum of material, because extra wire is not required to be wrapped or twisted at the joints between the line wires and stay wires.

I claim:

1. The method of continuously making wire mesh fabric which includes the steps of continuously moving at least three spaced line wires longitudinally in parallel relation, forming stay wires with partial loops spaced apart at intervals equal to the spacing of said line wires, positioning said stay wires one after another transversely across the line wires with the partial loops around said line wires, and simultaneously closing the loops of each stay wire around and under all of said line wires as the line wires move continuously in a longitudinal direction.

2. The method of continuously making wire mesh fabric which includes the steps of continuously moving at least three spaced line wires longitudinally in parallel relation, forming bends in said line wires at longitudinal intervals, forming stay wires with partial downwardly open loops at intervals equal to the spacing of said line wires, depositing said stay wires one after another transversely on the line wires with said partial loops resting on the bends in the line wires, and simultaneously closing the loops of each stay wire around and under all of said line wires as the line wires move continuously in a longitudinal direction.

3. The method of continuously making wire mesh fabric which includes the steps of continuously moving at least three spaced line wires longitudinally, forming transverse rows of downward bends in said line wires at longitudinal intervals, preforming stay wires with downwardly open partial loops adapted to register with said line wires, automatically depositing at one location along the line wires preformed stay wires at intervals on rows of said downward bends in the line wires with at least one other row of downward bends between said stay wires, automatically depositing at another location preformed stay wires on said other rows of downward bends in the line wires, and then simultaneously closing the loops of each of the stay wires around all of the line wires as the line wires move continuously in a longitudinal direction.

4. The method of continuously making wire mesh fabric which includes the steps of continuously moving spaced line wires longitudinally, preforming stay wires with downwardly open partial loops spaced at intervals equal to the spacing of the line wires and with upward bends between said loops, depositing said preformed stay wires one after another across said line wires with said partial loops over said line wires, crimping said stay wire partial loops around the line wires, and simultaneously straightening said upward bends between loops, as the line wires move continuously in a longitudinal direction.

5. The method of continuously making wire mesh fabric which includes the steps continuously moving spaced line wires longitudinally, forming downward bends in said line wires at longitudinal intervals, preforming stay wires with downwardly open partial loops spaced apart at intervals equal to the spacing of the line wires and with upward bends between said loops, depositing said preformed stay wires one after another across said line wires with said partial loops over said downward bends, and crimping said stay wire partial loops around said line wires and simultaneously straightening said upward bends in the stay wires between loops, as the line wires move continuously in a longitudinal direction.

6. The method of continuously making wire mesh fabric which includes the steps of continuously moving at least three spaced line wires longitudinally, preforming stay wires into a sinuous form, depositing said preformed stay wires one after another across the moving line wires at spaced intervals, crimping said stay wires into closed loops around said line wires, and holding said loops in crimped position around said line wires for a predetermined period of time to set the loops, while the line wires move continuously in a longitudinal direction.

7. The method of continuously making wire mesh fabric which includes the steps of continuously moving spaced line wires longitudinally, preforming stay wires with downwardly open partial loops, depositing said preformed stay wires one after another across the moving line wires with said partial loops over said line wires, closing said stay wire partial loops around said line wires, and maintaining said loops in closed position for a predetermined period of time to set the loops, as the line wires move continuously in a longitudinal direction.

8. In a method of continuously making wire mesh fabric, the steps of continuously moving at least three spaced line wires longitudinally, forming spaced downwardly open partial loops in stay wires from the center progressively outward toward the ends of said stay wires, depositing said formed stay wires one after another across said moving line wires with said loops over said line wires, and closing said loops around said line wires during said continuous movement thereof.

9. In a method of continuously making wire mesh fabric, the steps of continuously moving at least three spaced line wires longitudinally, forming spaced downwardly open partial loops alternating with upward bends in stay wires from the center progressively outward toward the ends of said stay wires, depositing said formed stay wires one after another across said moving line wires with said loops over said line wires, and closing said loops around said line wires during said continuous movement thereof.

10. The method of continuously making wire mesh fabric which includes the steps of continuously moving spaced line wires longitudinally, preforming stay wires into alternate downwardly open partial loops and upward bends from the center progressively outward toward the ends of said stay wires, depositing said stay wires one after another at longitudinal intervals across said moving line wires with said partial loops over said line wires, and closing the partial loops of said stay wires one after another around said line wires, as the line wires move continuously in a longitudinal direction.

11. The method of continuously making wire mesh fabric which includes the steps of continuously moving spaced line wires longitudinally, preforming stay wires with spaced open loops therein, depositing said preformed stay wires transversely across said moving line wires, simultaneously closing the open loops of each stay wire around and under all of the line wires, and roller welding the closed portions of said loops together under the line wires, all as the line wires move continuously in a longitudinal direction.

GEORGE R. ROEMER.